United States Patent
Hatano et al.

(10) Patent No.: US 7,667,415 B2
(45) Date of Patent: Feb. 23, 2010

(54) BACKLIGHT CONTROL DEVICE AND DISPLAY APPARATUS

(75) Inventors: Takahisa Hatano, Hokkaido (JP); Kosho Suzuki, Hokkaido (JP)

(73) Assignee: Panasonic Corporation, Osaka (JP)

( * ) Notice: Subject to any disclaimer, the term of this patent is extended or adjusted under 35 U.S.C. 154(b) by 287 days.

(21) Appl. No.: 11/814,491

(22) PCT Filed: Jan. 18, 2006

(86) PCT No.: PCT/JP2006/300646
§ 371 (c)(1),
(2), (4) Date: Jul. 23, 2007

(87) PCT Pub. No.: WO2006/080219
PCT Pub. Date: Aug. 3, 2006

(65) Prior Publication Data
US 2009/0015179 A1 Jan. 15, 2009

(30) Foreign Application Priority Data

| Jan. 25, 2005 | (JP) | ............................. 2005-016455 |
| Feb. 7, 2005 | (JP) | ............................. 2005-030065 |
| Feb. 15, 2005 | (JP) | ............................. 2005-037144 |

(51) Int. Cl.
*G05F 1/00* (2006.01)
(52) U.S. Cl. .................... 315/307; 315/297; 315/209 R; 315/DIG. 4; 345/102; 345/213; 345/690; 345/87
(58) Field of Classification Search ................. 315/307, 315/297, 291, 209 R, 362, DIG. 4, DIG. 7; 345/87, 98, 213, 102, 204, 690
See application file for complete search history.

(56) References Cited

U.S. PATENT DOCUMENTS 5,105,127 A * 4/1992 Lavaud et al. ............... 315/291

(Continued)

FOREIGN PATENT DOCUMENTS

JP     6-243987     9/1994

(Continued)

OTHER PUBLICATIONS

English language Abstract of JP 11-297485.

(Continued)

*Primary Examiner*—Haissa Philogene
(74) *Attorney, Agent, or Firm*—Greenblum & Bernstein P.L.C.

(57) ABSTRACT

A PWM generation circuit is set so as to generate a PWM pulse signal having a frequency that is an odd number times a vertical synchronization frequency. A frequency division circuit frequency-divides the PWM pulse signal generated by the PWM generation circuit. An AND gate calculates the logical product of the PWM pulse signal generated by the PWM generation circuit and a frequency-division pulse signal outputted from the frequency division circuit. An OR gate calculates the logical sum of the PWM pulse signal generated by the PWM generation circuit and the frequency-division pulse signal outputted from the frequency division circuit. A selector outputs an output signal of the OR gate as a dimming pulse signal in a case where the set duty ratio is not less than 50%, while outputting an output signal of the AND gate as a dimming pulse signal in a case where the set duty ratio is less than 50%. Consequently, the frequency of the dimming pulse signal is five-second the frequency of a vertical synchronizing signal.

12 Claims, 6 Drawing Sheets

U.S. PATENT DOCUMENTS

| | | | |
|---|---|---|---|
| 5,337,068 A * | 8/1994 | Stewart et al. | 345/88 |
| 5,844,540 A | 12/1998 | Terasaki | |
| 6,118,221 A | 9/2000 | Kumasaka et al. | |
| 6,226,196 B1 * | 5/2001 | Toshinari et al. | 363/134 |
| 6,407,480 B1 * | 6/2002 | Nakanishi et al. | 310/316.01 |
| 7,233,307 B2 | 6/2007 | Miura et al. | |

FOREIGN PATENT DOCUMENTS

| | | |
|---|---|---|
| JP | 7-325286 | 12/1995 |
| JP | 11-126696 | 5/1999 |
| JP | 11-297485 | 10/1999 |

OTHER PUBLICATIONS

English language Abstract of JP 6-243987.
English language Abstract of JP 11-126696.
English language Abstract of JP 7-325286.

* cited by examiner

BACKLIGHT CONTROL DEVICE AND DISPLAY APPARATUS

FIELD OF THE INVENTION

The present invention relates to a backlight control device that controls the luminance of a backlight and a display apparatus including the same.

BACKGROUND OF THE INVENTION

Generally in video equipment using liquid crystals, for example, liquid crystal televisions or liquid crystal display apparatuses, images are displayed by light emission of backlights composed of cold cathode-ray tubes. Inverters are used so as to generate driving signals for controlling and driving the backlights.

Generally in order to control the luminances of backlights, there are current or voltage dimming systems for changing input DC voltages or input DC currents of inverters to change currents flowing in cold cathode-ray tubes and PWM dimming (burst dimming) systems for controlling light emission and extinction at an oscillation frequency by PWM (Pulse Width Modulation) pulses.

The current or voltage dimming systems have advantages in that noises (audible sounds) generated from the inverters are small and stable but have disadvantages in that the dimming ranges are narrow.

On the other hand, the PWM dimming systems have advantages in that the dimming ranges are wide and are used in the functions of adjusting backlights by users, for example.

Generally, PWM pulse signals for driving inverters are asynchronous with the vertical synchronization frequency of video signals to be inputted. When the PWM pulse signals are asynchronous with the vertical synchronization frequency, however, there occur phenomena in which noises move on screens or phenomena in which interference stripes appear on screens.

Therefore, it has been proposed that the PWM pulse signal is synchronized with the vertical synchronization frequency (see Patent Document 1, for example).

When the frequency of the PWM pulse signal is set to integral multiples of the vertical synchronization frequency, however, a flicker is generated due to the change in time of the light transmittance of a liquid crystal (see Patent Document 2). In order to prevent the generation of the flicker, there is provided a PWM dimming driving circuit that causes a fluorescent tube to flicker m times (m is an integer more than n and other than multiples of n) during a display period for n pictures (n is an integer of not less than 2) in a liquid crystal display apparatus with a backlight control function in the Patent Document 2.

[Patent Document 1] JP 11-126696 A
[Patent Document 2] JP 7-325286 A

SUMMARY OF THE INVENTION

Problems to be Solved by the Invention

In recent years, in display apparatuses having liquid crystal display panels, for example, a liquid crystal television and a liquid crystal display apparatus, a video signal processing system is also composed of an LSI (Large-Scale Integrated Circuit). A system for scaling, contour correction, gamma correction, and so on required to display an image on a liquid crystal display panel has been realized by a one-chip LSI.

Such an LSI also contains various types of peripheral circuits so as to exhibit cost merits, and also contains a PWM generation circuit for generating a PWM pulse signal for driving an inverter.

In order to prevent a flicker from being generated in the liquid crystal display panel, it is desirable that the frequency of the PWM pulse signal for driving the inverter is set to an (odd number/2) times that of the vertical synchronization frequency.

In the PWM generation circuit composed of the LSI, however, the frequency of the PWM pulse signal can be only set to integral multiples of the vertical synchronization frequency.

On the other hand, in the liquid crystal display apparatus with a backlight control function described in the Patent Document 2, the fluorescent tube can be caused to blink at a frequency of m/n by the PWM dimming driving circuit.

However, the circuit configuration of the PWM dimming driving circuit is complicated, and the existing PWM generation circuit composed of the LSI cannot be utilized. Therefore, component costs and manufacturing costs rise.

In the conventional PWM generation circuit, in a transition period in switching the duty ratio of the PWM pulse signal, the duty ratio of the PWM pulse signal may be disturbed, and pulses having a short period may be temporarily generated in the PWM pulse signal. Therefore, there occurs a phenomenon in which discontinuity occurs in the change in the luminance of the backlight or a screen is instantaneously brightened or darkened.

An object of the present invention is to provide a backlight control device that can be reduced in size and cost while preventing generation of a flicker and a display apparatus comprising the same.

Another object of the present invention is to provide a backlight control device that can be reduced in size and cost while preventing generation of a flicker, discontinuous changes in luminance, and instantaneous changes in luminance.

Means for Solving the Problems (1)

A backlight control device that controls the luminance of a backlight according to an aspect of the present invention comprises an inverter that drives the backlight in response to a dimming pulse signal for controlling a luminance; a designator that designates the duty ratio of the dimming pulse signal; a pulse generator that generates a first pulse signal having a frequency that is an odd number times a vertical synchronization frequency and being pulse-width modulated on the basis of the duty ratio designated by the designator and a vertical synchronizing signal; a frequency divider that frequency-divides the first pulse signal generated by the pulse generator, to output a second pulse signal having a frequency that is one-half that of the first pulse signal; a first logic element that performs a first logical operation on the first pulse signal generated by the pulse generator and the second pulse signal outputted by the frequency divider; a second logic element that performs a second logical operation on the first pulse signal generated by the pulse generator and the second pulse signal outputted by the frequency divider; and a selector that selects an output signal of the first logic element as a third pulse signal in a case where the duty ratio designated by the designator is not less than a predetermined value, while selecting an output signal of the second logic element as a third pulse signal in a case where the duty ratio designated by the designator is less than the predetermined value, to output a third pulse signal having a frequency that is an (odd number/2) times the vertical synchronization frequency as the dimming pulse signal.

In the backlight control device, when the designator designates the duty ratio of the dimming pulse signal, the pulse generator generates the first pulse signal on the basis of the designated duty ratio and the vertical synchronizing signal. The first pulse signal has a frequency that is an odd number times the vertical synchronization frequency and is pulse-width modulated. The frequency divider frequency-divides the first pulse signal, so that the second pulse signal is outputted from the frequency divider. The second pulse signal has a frequency that is one-half the frequency of the first pulse signal.

The first logic element performs the first logical operation on the first pulse signal and the second pulse signal. The second logic element performs the second logical operation on the first pulse signal and the second pulse signal.

The selector selects the output signal of the first logic element as the third pulse signal in the case where the duty ratio designated by the designator is not less than the predetermined value, while selecting the output signal of the second logic element as the third pulse signal in the case where the duty ratio designated by the designator is less than the predetermined value. Thus, the third pulse signal having the frequency that is an (odd number/2) times the vertical synchronization frequency is outputted as the dimming pulse signal. The inverter drives the backlight in response to the dimming pulse signal.

In this way, the dimming pulse signal having the frequency that is an (odd number/2) times the vertical synchronization frequency is fed to the inverter. Therefore, a flicker is prevented from being generated on the screen of the display apparatus using the backlight control device.

In this case, the backlight control device comprises the frequency divider, the first and second logic elements, and the selector in addition to the inverter, the pulse generator, and the designator. Consequently, the dimming pulse signal having the frequency that is an (odd number/2) times the vertical synchronization frequency can be outputted in a simple configuration. As a result, it is possible to reduce the size and the cost of the backlight control device.

(2)

The predetermined value may be 50%. In this case, the selector selects the output signal of the first logic element as the third pulse signal in a case where the duty ratio designated by the designator is not less than 50%, while selecting the output signal of the second logic element as the third pulse signal in a case where the duty ratio designated by the designator is less than 50%. Thus, the third pulse signal having the frequency that is an (odd number/2) times the vertical synchronization frequency is outputted as the dimming pulse signal to the inverter.

(3)

The pulse generator may set the duty ratio of the first pulse signal to 2 (D-50) % in a case where the duty ratio D designated by the designator is not less than 50%, while setting the duty ratio of the first pulse signal to 2D % in a case where the duty ratio D designated by the designator is less than 50%.

Thus, the dimming pulse signal having the frequency that is an (odd number/2) times the vertical synchronization frequency in the case where the duty ratio D designated by the designator is not less than 50% and having the designated duty ratio of not less than 50% is outputted to the inverter. On the other hand, the dimming pulse signal having the frequency that is an (odd number/2) times the vertical synchronization frequency in the case where the duty ratio D designated by the designator is less than 50% and having the designated duty ratio of less than 50% is outputted to the inverter.

(4)

The selector may output a pulse signal having a predetermined duty ratio in a predetermined period as the dimming pulse signal in a case where the duty ratio designated by the designator is switched between a value that is not less than the predetermined value and a value that is less than the predetermined value.

In this case, the dimming pulse signal having the predetermined duty ratio is outputted to the inverter in the case where the duty ratio designated by the designator is switched between the value that is not less than the predetermined value and the value that is less than the predetermined value. Thus, the dimming pulse signal can be stably changed when the duty ratio is switched. Accordingly, the duty ratio of the dimming pulse signal is prevented from being disturbed. Therefore, a phenomenon in which discontinuity occurs in the change in the luminance of the backlight and the luminance is instantaneously brightened or darkened is prevented from occurring.

(5)

The selector may output the second pulse signal outputted from the frequency divider for a predetermined time period as the dimming pulse signal in a case where the duty ratio designated by the designator is switched between a value that is not less than the predetermined value and a value that is less than the predetermined value.

In this case, the dimming pulse signal having a duty ratio of 50% is outputted to the inverter in the case where the duty ratio designated by the designator is switched between the value that is not less than the predetermined value and the value that is less than the predetermined value. Thus, the dimming pulse signal can be stably changed when the duty ratio is switched. Thus, the duty ratio of the dimming pulse signal is prevented from being disturbed. Therefore, a phenomenon in which discontinuity occurs in the change in the luminance of the backlight and the luminance is instantaneously brightened or darkened is prevented from occurring.

(6)

The backlight control device may further comprise a pulse expander that expands a pulse of the first pulse signal generated by the pulse generator to a predetermined width and outputs a fourth pulse signal having the expanded pulse, and the frequency divider may frequency-divide the fourth pulse signal outputted from the pulse expander.

In this case, the pulse of the first pulse signal is expanded, and the fourth pulse signal having the expanded pulse is frequency-divided. This prevents an improper period from being generated in the dimming pulse signal in a case where the duty ratio designated by the designator is changed. Therefore, a phenomenon in which discontinuity occurs in the change in the luminance of the backlight and the luminance is instantaneously brightened or darkened is prevented from occurring.

(7)

The pulse expander may comprise a mono-multi vibrator. In this case, the fourth pulse signal having the pulse having a predetermined width expanded in response to the pulse of the first pulse signal is outputted, and the fourth pulse signal having the expanded pulse is frequency-divided. This prevents an improper period from being generated in the dimming pulse signal in a case where the duty ratio designated by the designator is changed. Therefore, a phenomenon in which discontinuity occurs in the change in the luminance of the backlight and the luminance is instantaneously brightened or darkened is prevented from occurring.

(8)

The first logical operation may be the logical sum, and the second logical operation may be the logical product.

In this case, the first logic element calculates the logical sum of the first pulse signal and the second pulse signal. Further, the second logic element calculates the logical product of the first pulse signal and the second pulse signal. Thus, the third pulse signal having the frequency that is an (odd number/2) times the vertical synchronization frequency is outputted as the dimming pulse signal from the selector.

(9)

The first logic element may comprise an OR gate, and the second logic element may comprise an AND gate.

In this case, the OR gate calculates the logical sum of the first pulse signal and the second pulse signal. Further, the AND gate calculates the logical product of the first pulse signal and the second pulse signal. Thus, the third pulse signal having the frequency that is an (odd number/2) times the vertical synchronization frequency is outputted as the dimming pulse signal from the selector.

(10)

A display apparatus according to another aspect of the present invention comprises a signal processing circuit that converts an inputted video signal into a predetermined format and separates a vertical synchronizing signal; a display panel that displays the video signal obtained by the signal processing circuit as an image; a backlight provided on a back surface of the display panel; and a backlight control device that controls the luminance of the backlight, the backlight control device comprising an inverter that drives the backlight in response to a dimming pulse signal for controlling a luminance, a designator that designates the duty ratio of the dimming pulse signal, a pulse generator that generates a first pulse signal having a frequency that is an odd number times a vertical synchronization frequency and being pulse-width modulated on the basis of the duty ratio designated by the designator and a vertical synchronizing signal separated by the signal processing circuit, a frequency divider that frequency-divides the first pulse signal generated by the pulse generator, to output a second pulse signal having a frequency that is one-half that of the first pulse signal, a first logic element that performs a first logical operation on the first pulse signal generated by the pulse generator and the second pulse signal outputted by the frequency divider, a second logic element that performs a second logical operation on the first pulse signal generated by the pulse generator and the second pulse signal outputted by the frequency divider, and a selector that selects an output signal of the first logic element as a third pulse signal in a case where the duty ratio designated by the designator is not less than a predetermined value, while selecting an output signal of the second logic element as a third pulse signal in a case where the duty ratio designated by the designator is less than the predetermined value, to output a third pulse signal having a frequency that is an (odd number/2) times the vertical synchronization frequency as the dimming pulse signal.

In the display apparatus, the video signal inputted by the signal processing circuit is converted into the predetermined format, and the vertical synchronizing signal is separated. The display panel displays the image based on the video signal while being irradiated with light from the back surface by the backlight. The backlight control device adjusts the luminance of the backlight.

In the backlight control device, when the designator designates the duty ratio of the dimming pulse signal, the pulse generator generates the first pulse signal on the basis of the designated duty ratio and the vertical synchronizing signal. The first pulse signal has the frequency that is an odd number times the vertical synchronization frequency and is pulse-width modulated. The frequency divider frequency-divides the first pulse signal, so that the second pulse signal is outputted from the frequency divider. The second pulse signal has a frequency that is one-half the frequency of the first pulse signal.

The first logic element performs the first logical operation on the first pulse signal and the second pulse signal. The second logic element performs the second logical operation on the first pulse signal and the second pulse signal.

The selector selects the output signal of the first logic element as the third pulse signal in the case where the duty ratio designated by the designator is not less than the predetermined value, while selecting the output signal of the second logic element as the third pulse signal in the case where the duty ratio designated by the designator is less than the predetermined value. Thus, the third pulse signal having the frequency that is an (odd number/2) times the vertical synchronization frequency is outputted as the dimming pulse signal. The inverter drives the backlight in response to the dimming pulse signal.

In this way, the dimming pulse signal having the frequency that is an (odd number/2) times the vertical synchronization frequency is fed to the inverter. Therefore, the flicker is prevented from being generated on the screen of the display apparatus using the backlight control device.

In this case, the backlight control device comprises the frequency divider, the first and second logic elements, and the selector in addition to the inverter, the pulse generator, and the designator. Consequently, the dimming pulse signal having the frequency that is an (odd number/2) times the vertical synchronization frequency can be outputted in a simple configuration. As a result, it is possible to reduce the size and the cost of the backlight control device as well as to reduce the thickness, the weight, and the cost of the display apparatus.

(11)

The signal processing circuit and the pulse generator may be composed by a large-scale integrated circuit. Thus, the signal processing circuit and the pulse generator are miniaturized. In this case, the dimming pulse signal having the frequency that is an (odd number/2) times the vertical synchronization frequency can be also outputted by adding the frequency divider, the first and second logic elements, and the selector to the large-scale integrated circuit and the inverter. As a result, it is possible to reduce the size and the cost of the backlight control device.

(12)

The display panel may comprise a liquid crystal display panel. In this case, the liquid crystal display panel displays the image based on the video signal while being irradiated with light from the back surface by the backlight. The backlight control device adjusts the luminance of the backlight.

EFFECTS OF THE INVENTION

According to the present invention, the dimming pulse signal having the frequency that is an (odd number/2) times the vertical synchronization frequency is fed to the inverter, so that the flicker is prevented from being generated on the screen of the display apparatus using the backlight control device.

In this case, the backlight control device comprises the frequency divider, the first and second logic elements, and the selector in addition to the inverter, the pulse generator, and the designator. Consequently, the dimming pulse signal having the frequency that is an (odd number/2) times the vertical synchronization frequency can be outputted in a simple configuration. As a result, it is possible to reduce the size and the cost of the backlight control device.

DETAILED DESCRIPTION OF THE PREFERRED EMBODIMENTS

(1) First Embodiment (1-1) Configuration of Backlight Control Device

Figure 1:
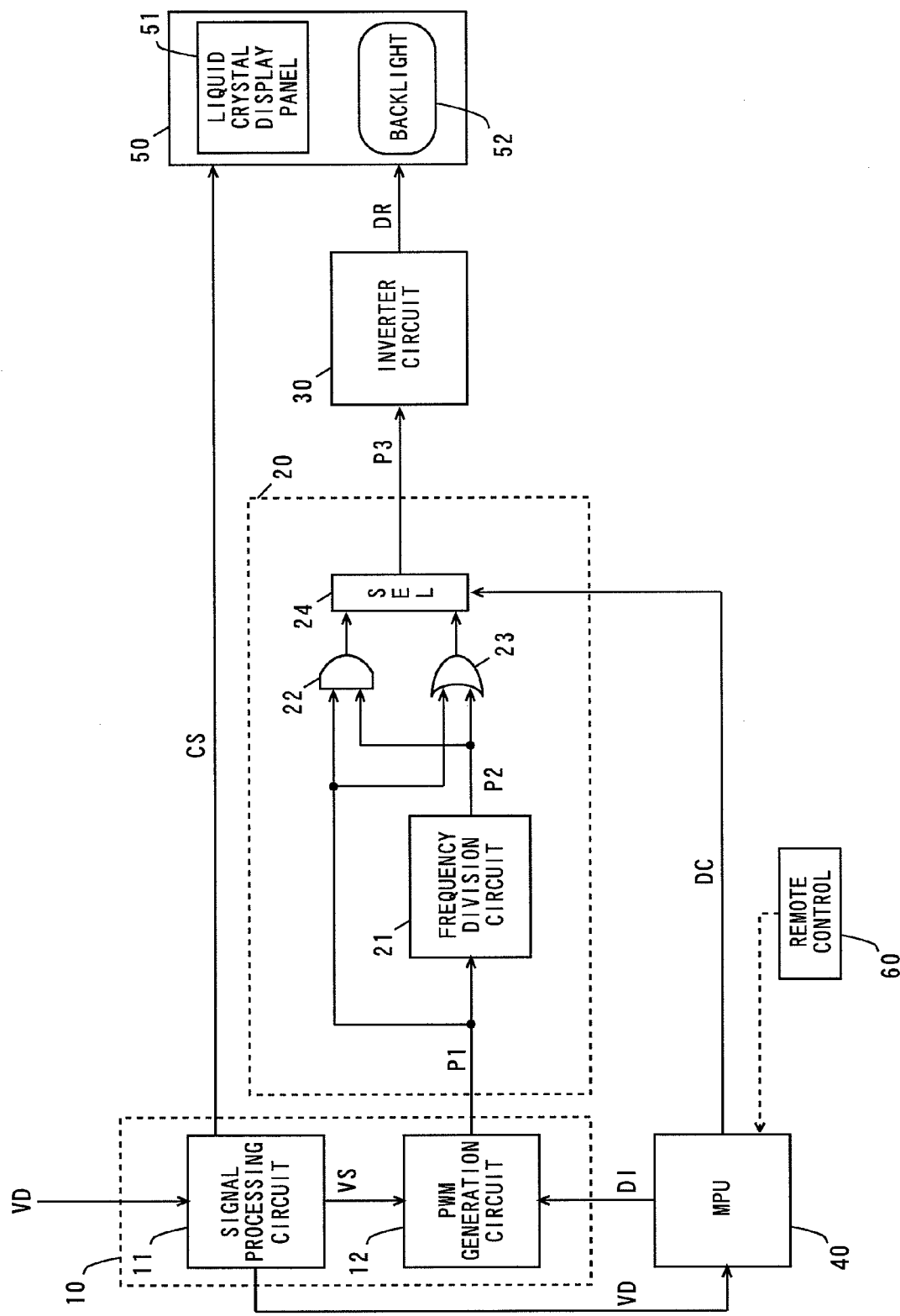
FIG. 1 is a block diagram showing the configuration of a display apparatus comprising a backlight control device according to a first embodiment of the present invention.

FIG. 1 is a block diagram showing the configuration of a display apparatus comprising a backlight control device according to a first embodiment of the present invention.

In FIG. 1, the display apparatus comprises a control device 10, an addition circuit 20, an inverter circuit 30, an MPU (Microprocessing Unit) 40, a liquid crystal panel module 50, and a remote control 60. The control device 10, the addition circuit 20, the inverter circuit 30, the MPU (Micro processing Unit) 40, and the remote control 60 constitute the backlight control device.

The control device 10 comprises a signal processing circuit 11 and a PWM (Pulse Width Modulation) generation circuit 12, and is composed of an LSI (Large-Scale Integrated Circuit).

The addition circuit 20 comprises a frequency division circuit 21, and an AND gate 22, an OR gate 23, and a selector 24. The liquid crystal panel module 50 comprises a liquid crystal display panel 51 and a backlight 52. The backlight 52 is composed of a cold cathode-ray tube, for example, and is arranged on a back surface of the liquid crystal display panel 51.

A video signal VD is inputted to the signal processing circuit 11. The signal processing circuit 11 converts the video signal VD into an RGB signal CS suitable for the liquid crystal display panel 51, and separates a vertical synchronizing signal VS and a horizontal synchronizing signal (not shown) from the video signal VD. The RGB signal CS obtained by the signal processing circuit 11 is fed to the liquid crystal display panel 51. Consequently, an image is displayed on the liquid crystal display panel 51 on the basis of the RGB signal CS.

The vertical synchronizing signal VS separated by the signal processing circuit 11 is fed to a PWM generation circuit 12. The PWM generation circuit 12 generates a PWM (Pulse Width Modulation) pulse signal P1 that is synchronized with the vertical synchronizing signal VS. The PWM generation circuit 12 generates the PWM pulse signal P1 having a frequency that is an integer times a vertical synchronization frequency (a vertical scanning frequency).

In the present embodiment, the PWM generation circuit 12 is set so as to generate the PWM pulse signal P1 having a frequency that is an odd number times the vertical synchronization frequency.

The frequency division circuit 21 frequency-divides the PWM pulse signal P1 generated by the PWM generation circuit 12, to output a frequency-division pulse signal P2. The frequency of the frequency-division pulse signal P2 is one-half the frequency of the PWM pulse signal P1.

The AND gate 22 calculates the logical product of the PWM pulse signal P1 generated by the PWM generation circuit 12 and the frequency-division pulse signal P2 outputted from the frequency division circuit 21. The OR gate 23 calculates the logical sum of the PWM pulse signal P1 generated by the PWM generation circuit 12 and the frequency-division pulse signal P2 outputted from the frequency division circuit 21.

The video signal VD is fed to the MPU 40 from the signal processing circuit 11. The MPU 40 feeds a duty designation signal DI to the PWM generation circuit 12 on the basis of the video signal VD or an instruction from the remote control 60 and feeds a duty control signal DC to the selector 24. The duty designation signal DI designates the duty ratio of the PWM pulse signal P1 generated by the PWM generation circuit 12. The duty control signal DC controls the selection operation of the selector 24.

The selector 24 selectively outputs an output signal of the AND gate 22 or an output signal of the OR gate 23 as a PWM pulse signal P3 in response to the duty control signal DC. The PWM pulse signal P3 is fed to the inverter circuit 30 as a dimming pulse signal.

The inverter circuit 30 feeds a driving signal DR to the backlight 52 on the basis of the PWM pulse signal P3 fed from the selector 24. Consequently, the backlight 52 is driven. The luminance of the backlight 52 is adjusted by controlling the duty ratio of the PWM pulse signal P3.

Here, the duty ratio of the PWM pulse signal P3 fed as the dimming pulse signal to the inverter circuit 30 is set on the basis of the video signal VD or the instruction from the remote control 60. The duty ratio of the PWM pulse signal P3 set on the basis of the video signal VD or the instruction from the remote control 60 is hereinafter referred to as a set duty ratio.

(1-2) Operations of Backlight Control Device

Figure 2:
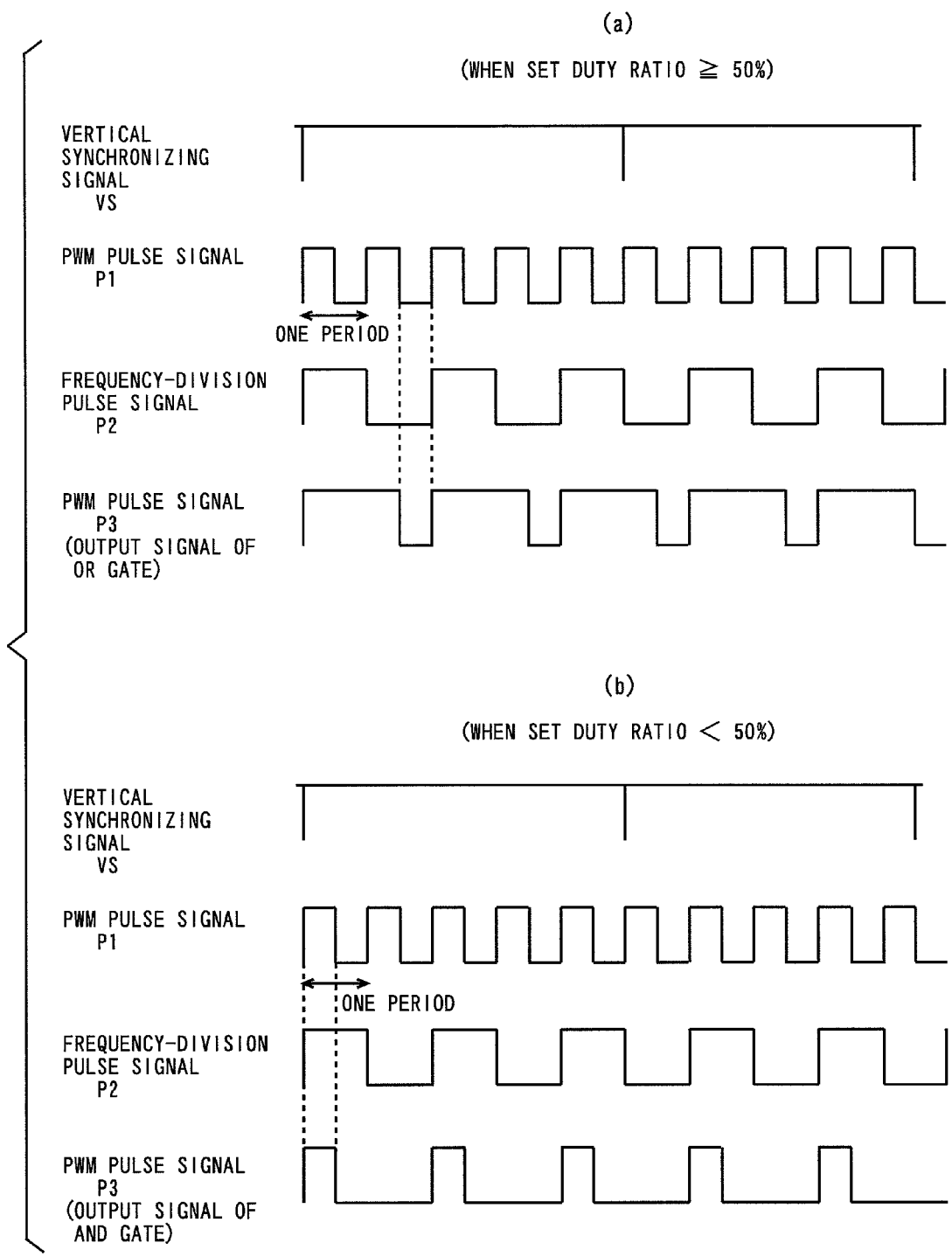
FIG. 2 is a timing chart of respective signals in units in the backlight control device shown in FIG. 1.

Referring now to FIG. 2, description is made of the specific operations of the backlight control device shown in FIG. 1. FIG. 2 is a timing chart of respective signals in units in the backlight control device shown in FIG. 1.

FIG. 2(a) shows the vertical synchronizing signal VS, the PWM pulse signal P1, the frequency-division pulse signal P2, and the PWM pulse signal P3 in a case where the set duty ratio is not less than 50%. FIG. 2(b) shows the vertical synchronizing signal VS, the PWM pulse signal P1, the frequency-division pulse signal P2, and the PWM pulse signal P3 in a case where the set duty ratio is less than 50%. The horizontal axis shown in FIG. 2 indicates time.

The video signal VD is composed of a composite signal, for example, or is composed of a luminance signal and a color difference signal. As described above, the signal processing circuit 11 converts the video signal VD into the RGB signal CS suitable for the liquid crystal display panel 51. In this case, the signal processing circuit 11 subjects the video signal VD to scaling processing, for example. In the scaling processing, the video signal VD is converted such that the number of pixels in its display region is adaptable to the resolution of the liquid crystal display panel 51. In order to convert the image quality based on the video signal VD so as to suit a user's preference by correcting the characteristics of the liquid crystal display panel 51, the video signal VD is subjected to contour correction, gamma correction, white balance adjustment, and so on.

The PWM generation circuit 12 generates the PWM pulse signal P1 in synchronization with the vertical synchronizing signal VS. In this case, the frequency of the PWM pulse signal P1 generated by the PWM generation circuit 12 is set to a frequency that is two times a desired frequency. In order to obtain the PWM pulse signal P3 that is five-second the vertical synchronization frequency, for example, the frequency of the PWM pulse signal P1 generated by the PWM generation circuit 12 is set to five times the vertical synchronization frequency. In the example shown in FIG. 2, the frequency of the PWM pulse signal P1 is five times the frequency of the vertical synchronizing signal VS.

The duty ratio of the PWM pulse signal P1 is controlled by the duty designation signal D1 on the basis of the set duty ratio by a method, described later. In the example shown in FIG. 2, the duty ratio of the PWM pulse signal P1 is 50%.

The frequency division circuit 21 frequency-divides the PWM pulse signal P1. As shown in FIG. 2, the frequency of the frequency-division pulse signal P2 is one-half the frequency of the PWM pulse signal P1.

The AND gate 22 calculates the logical product of the PWM pulse signal P1 and the frequency-division pulse signal P2. The OR gate 23 calculates the logical sum of the PWM pulse signal P1 and the frequency-division pulse signal P2.

In the case where the set duty ratio is not less than 50%, an output signal of the OR gate 23 is outputted as the PWM pulse signal P3 from the selector 24, as shown in FIG. 2(a). Thus, the frequency of the PWM pulse signal P3 is five-second the frequency of the vertical synchronizing signal VS.

In this case, the duty ratio of the PWM pulse signal P3 is set to two times a value obtained by subtracting 50% from the set duty ratio. In the example shown in FIG. 2(a), the set duty ratio is 75%. Consequently, the duty ratio of the PWM pulse signal P1 is set to 50%. Thus, the duty ratio of the PWM pulse signal P3 is 75%.

In the case where the set duty ratio is less than 50%, an output signal of the AND gate 22 is outputted as the PWM pulse signal P3 from the selector 24, as shown in FIG. 2(b). Thus, the frequency of the PWM pulse signal P3 is five-second the frequency of the vertical synchronizing signal VS.

In this case, the duty ratio of the PWM pulse signal P3 is set to two times the set duty ratio. In the example shown in FIG. 2(b), the set duty ratio is 25%. Consequently, the duty ratio of the PWM pulse signal P1 is set to 50%. Thus, the duty ratio of the PWM pulse signal P3 is 25%.

(1-3) Effect of First Embodiment

In the present embodiment, the PWM pulse signal P3 having a frequency that is an (odd number/2) times the vertical synchronizing signal VS can be outputted to the inverter circuit 30 by selecting the output signal of the OR gate 23 in the case where the set duty ratio is not less than 50%, while selecting the output signal of the AND gate 22 in the case where the set duty ratio is less than 50%. This prevents a flicker from being generated on a screen of the liquid crystal display panel 51.

In this case, the PWM pulse signal P3 having a frequency that is an (odd number/2) times the vertical synchronization frequency can be generated using the control device 10 capable of generating the PWM pulse signal P1 having a frequency that is only an integer times the vertical synchronization frequency by newly providing the addition circuit 20. As a result, it is possible to reduce the size and the cost of the backlight control device as well as to reduce the thickness, the weight, and the cost of the display apparatus.

(2) Second Embodiment (2-1) Configuration of Backlight Control Device

Figure 3:
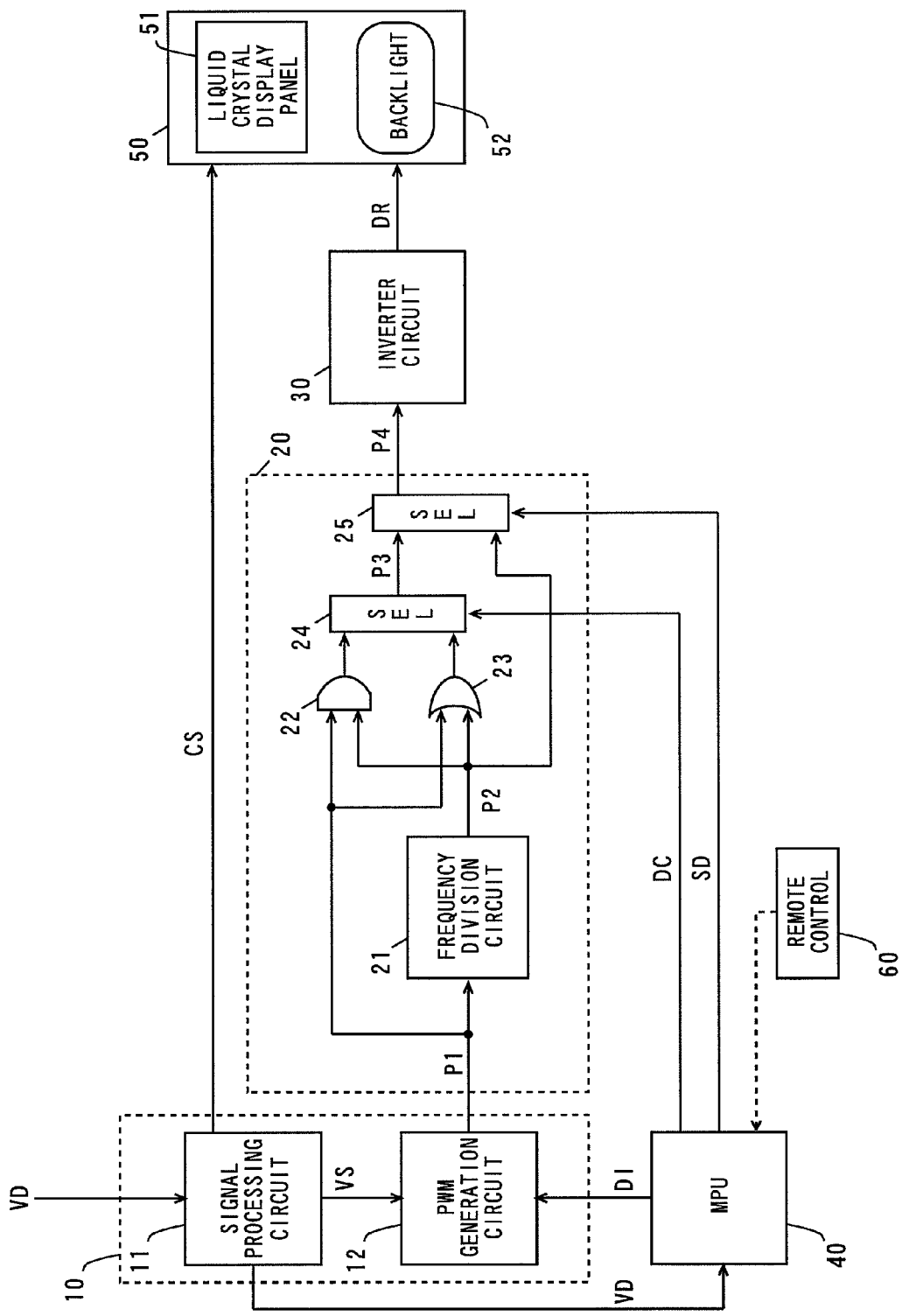
FIG. 3 is a block diagram showing the configuration of a display apparatus comprising a backlight control device according to a second embodiment of the present invention.

FIG. 3 is a block diagram showing the configuration of a display apparatus comprising a backlight control device according to a second embodiment of the present invention.

The backlight control device shown in FIG. 3 differs from the backlight control device shown in FIG. 1 in that an addition circuit 20 further comprises a selector 25.

An MPU 40 feeds a duty designation signal DI to a PWM generation circuit 12 on the basis of a video signal VD or an instruction from a remote control 60 and feeds a duty control signal DC to a selector 24, and further feeds a fixed duty switching signal SD to the selector 25. The fixed duty switching signal SD controls the selection operation of the selector 25.

The selector 25 selectively outputs a PWM pulse signal P3 outputted from the selector 24 or a frequency-division pulse signal P2 outputted from a frequency division circuit 21 as a PWM pulse signal P4 in response to the fixed duty switching signal SD. The PWM pulse signal P4 is fed to an inverter circuit 30 as a dimming pulse signal.

The inverter circuit 30 feeds a driving signal DR to a backlight 52 on the basis of the PWM pulse signal P4 fed from the selector 25. Thus, the backlight 52 is driven. The luminance of the backlight 52 is adjusted by controlling the duty ratio of the PWM pulse signal P4.

The configuration of other units in the backlight control device shown in FIG. 3 is the same as the configuration of the corresponding units in the backlight control device shown in FIG. 1.

(2-2) Operations of Backlight Control Device

A timing chart of a vertical synchronizing signal VS, a PWM pulse signal P1, the frequency-division pulse signal P2, and the PWM pulse signal P3 in a case where the set duty ratio is not less than 50% in the backlight control device shown in FIG. 3 is the same as the timing chart shown in FIG. 2(a), and a timing chart of the vertical synchronizing signal VS, the PWM pulse signal P1, the frequency-division pulse signal P2, and the PWM pulse signal P3 in a case where the set duty ratio is less than 50% is the same as the timing chart shown in FIG. 2(b).

Figure 4:
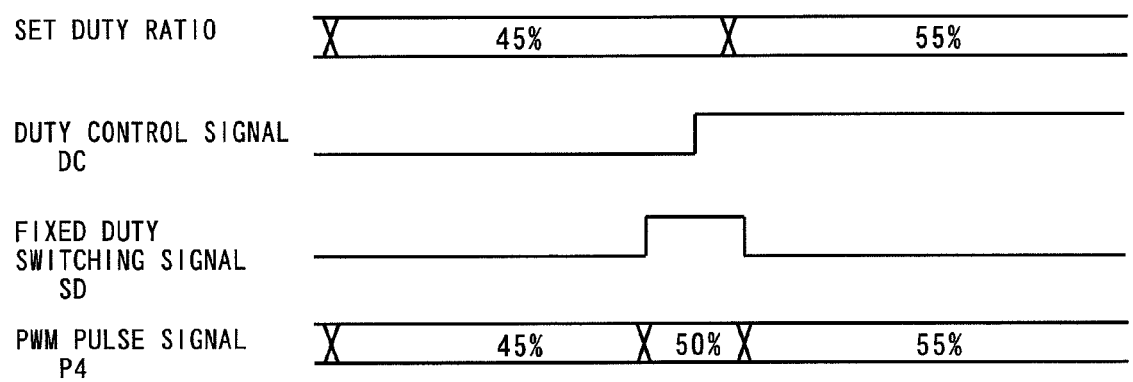
FIG. 4 is a timing chart for explaining the operations of the backlight control device at the time of switching the set duty ratio.

FIG. 4 is a timing chart for explaining the operations of the backlight control device at the time of switching the set duty ratio.

FIG. 4 shows the set duty ratio, the duty control signal DC, the fixed duty switching signal SD, and the PWM pulse signal P4. The horizontal axis shown in FIG. 4 indicates time.

In FIG. 4, the selector 24 outputs an output signal of an AND gate 22 as the PWM pulse signal P3 when the duty control signal DC is at a low level, while outputting an output signal of an OR gate 23 as the PWM pulse signal P3 when the duty control signal DC is at a high level.

Here, the duty designation signal DI shown in FIG. 3 is fed to the PWM generation circuit 12 using an I²C (Inter integrated circuit) bus, and the duty control signal DC is fed to the selector 24 using a port of the MPU 40. In the case where the set duty ratio is changed from a value that is less than 50% to a value that is not less than 50% or a case where the set duty ratio is changed from a value that is not less than 50% to a value that is less than 50%, therefore, the timing of the change in the duty designation signal DI and the timing of the change in the duty control signal DC may not strictly coincide with each other. When the set duty ratio is changed, therefore, the duty ratio of the PWM pulse signal P3 may, in some cases, be instantaneously shifted from the set duty ratios before and after the change.

In the example shown in FIG. 4, the timing at which the set duty ratio is switched from 45% to 55% and the timing at which the duty control signal DC is raised from a low level to a high level are shifted.

Between the timing at which the duty control signal DC is raised from a low level to a high level and the timing at which the set duty ratio is switched from 45% to 55%, the duty ratio of the PWM pulse signal P3 outputted from the selector 24 becomes unstable. Consequently, there occurs a phenomenon in which discontinuity occurs in the change in the luminance of the backlight 52 or the whole screen of the liquid crystal display panel 51 is instantaneously brightened or darkened.

In the present embodiment, in the case where the set duty ratio is changed from the value that is less than 50% to the value that is not less than 50% or the case where the set duty ratio is changed from the value that is not less than 50% to the value that is less than 50%, a pulse having a predetermined width is generated in the fixed duty switching signal SD. The pulse is raised to a high level at timing before the time when the duty control signal DC is changed, while being lowered to a low level at timing after the time when the set duty ratio is changed.

The selector 25 outputs the PWM pulse signal P3 outputted from the selector 25 as the PWM pulse signal P4 when the fixed duty switching signal SD is at a low level, while outputting the frequency-division pulse signal P2 outputted from the frequency division circuit 21 as the PWM pulse signal P4 when the fixed duty switching signal SD is at a high level. The duty ratio of the frequency-division pulse signal P2 is 50%.

Thus, the duty ratio of the PWM pulse signal P4 is 50% in a transition period during which the set duty ratio is changed from the value that is less than 50% to the value that is not less than 50% and a transition period during which the set duty ratio is changed from the value that is not less than 50% to the value that is less than 50%.

In the example shown in FIG. 4, in a case where the set duty ratio is changed from 45% to 55%, the duty ratio of the PWM pulse signal P4 is changed to 45%, 50%, and 55% in this order.

The duty ratio of the PWM pulse signal P4 fed to the inverter 30 is thus stably changed.

(2-3) Effect of Second Embodiment

The PWM pulse signal P4 having a frequency that is an (odd number/2) times the vertical synchronizing signal VS can be thus outputted to the inverter circuit 30 by selecting the output signal of the OR gate 23 in the case where the set duty ratio is not less than 50%, while selecting the output signal of the AND gate 22 in the case where the set duty ratio is less than 50%. Consequently, a flicker is prevented from being generated on the screen of the liquid crystal display panel 51.

In this case, the new provision of the addition circuit 20 allows PWM pulse signal P3 having a frequency that is an (odd number/2) times the vertical synchronization frequency to be generated using the control device 10 capable of generating the PWM pulse signal P1 having a frequency that is only an integer times the vertical synchronization frequency. As a result, it is possible to reduce the size and the cost of the backlight control device as well as to reduce the thickness, the weight, and the cost of the display apparatus.

The use of the fixed duty switching signal SD allows the PWM pulse signal P4 to be stably changed in the case where the set duty ratio is changed from the value that is less than 50% to the value that is not less than 50% or the case where the set duty ratio is changed from the value that is not less than 50% to the value that is less than 50%. Thus, the duty ratio of the PWM pulse signal P4 is prevented from being disturbed. Consequently, a phenomenon in which discontinuity occurs in the change in the luminance of the backlight 52 and the screen of the liquid crystal display panel 51 is instantaneously brightened or darkened is prevented from occurring.

In a case where the duty ratio of the PWM pulse signal P1 is changed from 0% or 100% to another value, the duty ratio of the PWM pulse signal P1 may, in some cases, be shifted from a proper value depending on the control device 10. In such a case, the duty ratio of the PWM pulse signal P4 can be also stably changed using the fixed duty switching signal SD.

(3) Third Embodiment (3-1) Configuration of Backlight Control Device

Figure 5:
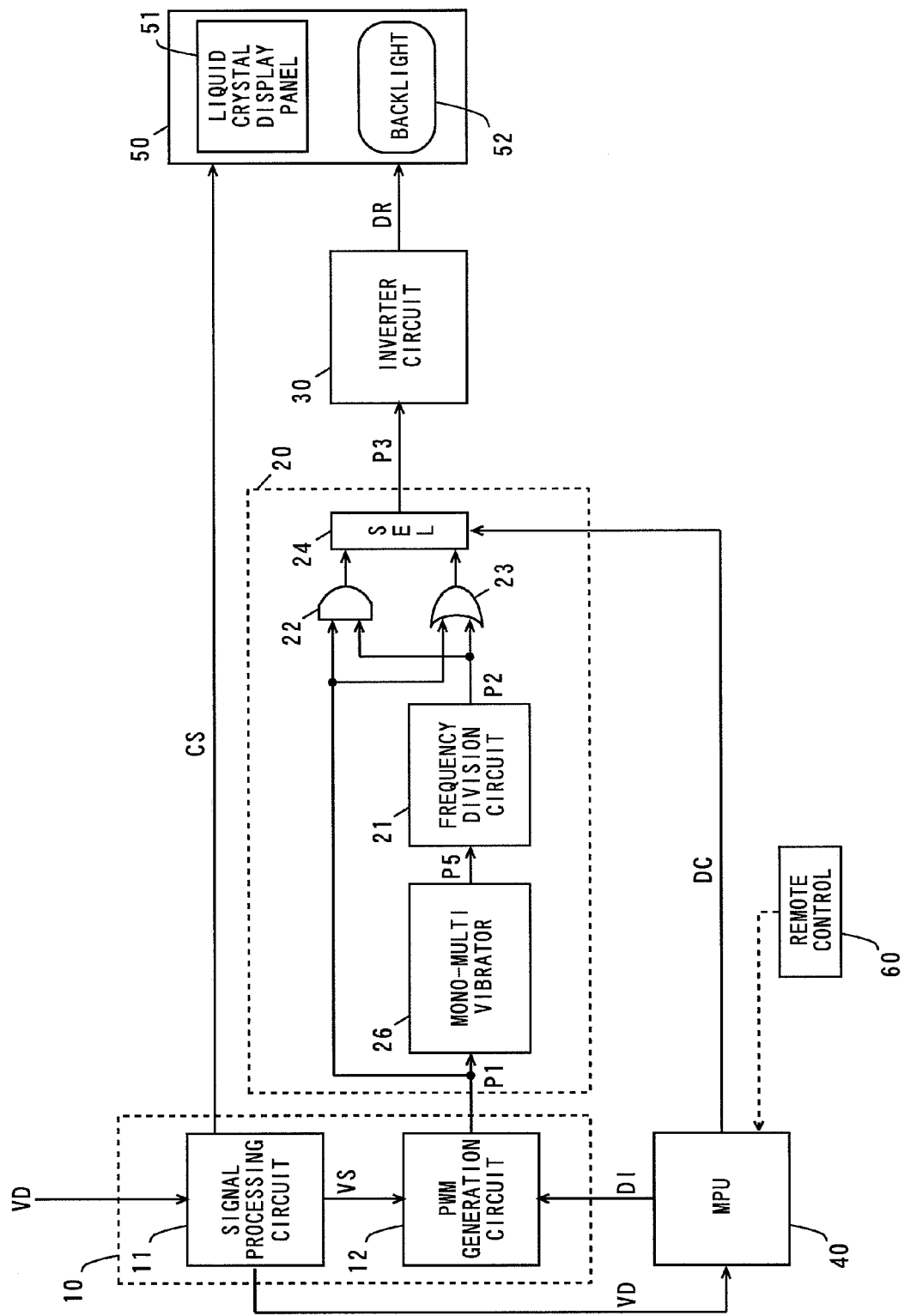
FIG. 5 is a block diagram showing the configuration of a display apparatus comprising a backlight control device according to a third embodiment of the present invention.

FIG. 5 is a block diagram showing the configuration of a display apparatus comprising a backlight control device according to a third embodiment of the present invention.

The backlight control device shown in FIG. 5 differs from the backlight control device shown in FIG. 1 in that an addition circuit 20 further comprises a mono-multi vibrator 26.

A PWM pulse signal P1 generated by a PWM generation circuit 12 is fed to the mono-multi vibrator 26. The mono-multi vibrator 26 outputs an expanded pulse signal P5 having a pulse having a predetermined width in response to the PWM pulse signal P1. Specifically, the expanded pulse signal P5 has a pulse that enters a high level for a predetermined period from the time when the PWM pulse signal P1 rises.

A frequency division circuit 21 frequency-divides the expanded pulse signal P5 generated by the mono-multi vibrator 26, to output a frequency-division pulse signal P2. The frequency of the frequency-division pulse signal P2 is one-half the frequency of the PWM pulse signal P1 and the expanded pulse signal P5.

An AND gate 22 calculates the logical product of the PWM pulse signal P1 generated by the PWM generation circuit 12 and the frequency-division pulse signal P2 outputted from the frequency division circuit 21. An OR gate 23 calculates the logical sum of the PWM pulse signal P1 generated by the PWM generation circuit 12 and the frequency-division pulse signal P2 outputted from the frequency division circuit 21.

A selector 24 selectively outputs an output signal of the AND gate 22 or an output signal of the OR gate 23 as a PWM pulse signal P3 in response to a duty control signal DC. The PWM pulse signal P3 is fed to an inverter circuit 30 as a dimming pulse signal.

The inverter circuit 30 feeds a driving signal DR to a backlight 52 on the basis of the PWM pulse signal P3 fed from the selector 24. Consequently, the backlight 52 is driven. The luminance of the backlight 52 is adjusted by controlling the duty ratio of the PWM pulse signal P3.

The configuration of other units in the backlight control device shown in FIG. 5 is the same as the configuration of the corresponding units in the backlight control device shown in FIG. 1.

(3-2) Operations of Backlight Control Device

A timing chart of a vertical synchronizing signal VS, the PWM pulse signal P1, the frequency-division pulse signal P2, and the PWM pulse signal P3 in a case where the set duty ratio is not less than 50% in the backlight control device shown in FIG. 5 is the same as the timing chart shown in FIG. 2(a), and a timing chart of the vertical synchronizing signal VS, the PWM pulse signal P1, the frequency-division pulse signal P2, and the PWM pulse signal P3 in a case where the set duty ratio is less than 50% is the same as the timing chart shown in FIG. 2(b).

Figure 6:
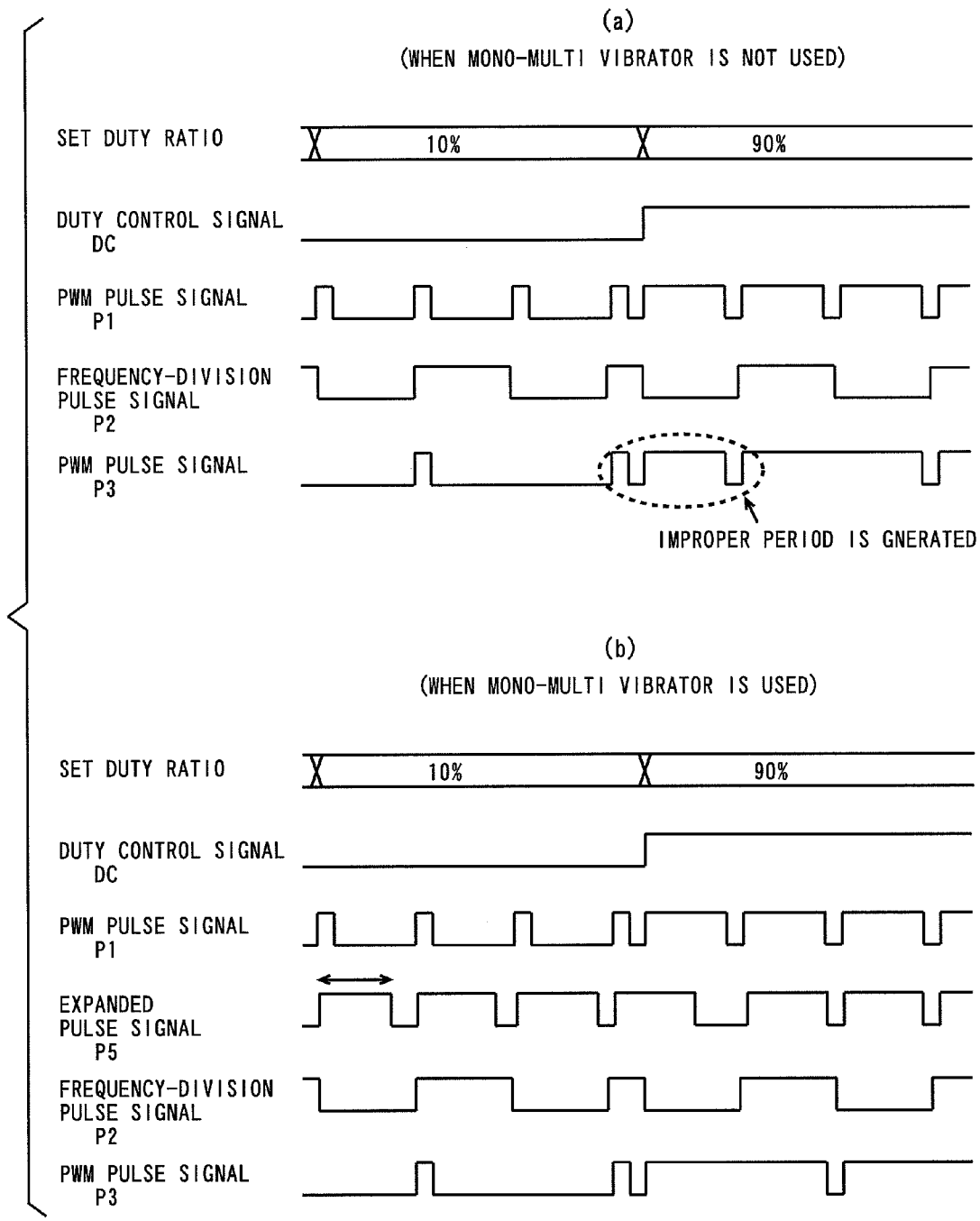
FIG. 6 is a timing chart for explaining the operations of the backlight control device at the time of switching the set duty ratio.

FIG. 6 is a timing chart for explaining the operations of the backlight control device at the time of switching the set duty ratio. FIG. 6(a) shows the set duty ratio, the duty control signal DC, the PWM pulse signal P1, the frequency-division pulse signal P2, and the PWM pulse signal P3 in a case where the mono-multi vibrator 26 is not used. FIG. 6(b) shows the set duty ratio, the duty control signal DC, the PWM pulse signal P1, the expanded pulse signal P5, the frequency-division pulse signal P2, and the PWM pulse signal P3 in a case where the mono-multi vibrator 26 is used. The horizontal axis shown in FIG. 6 indicates time.

In FIG. 6, the selector 24 outputs an output signal of the AND gate 22 as the PWM pulse signal P3 when the duty control signal DC is at a low level, while outputting an output signal of the OR gate 23 as the PWM pulse signal P3 when the duty control signal DC is at a high level.

Here, in the case where the mono-multi vibrator 26 is not used, as shown in FIG. 6(a), an improper period is generated in the PWM pulse signal P3 when the set duty ratio is changed. In this example, the period of the PWM pulse signal P3 is temporarily shortened when the set duty ratio is changed. Thus, there occurs a phenomenon in which discontinuity occurs in the change in the luminance of the backlight 52 and a screen of a liquid crystal display panel 51 is instantaneously brightened or darkened.

In the present embodiment, the improper period is prevented from being generated in the PWM pulse signal P3 when the set duty ratio is changed, as shown in FIG. 6(b), by providing the mono-multi vibrator 26 in the preceding stage of the frequency division circuit 21. Thus, the phenomenon in which discontinuity occurs in the change in the luminance of the backlight 52 and the screen of the liquid crystal display panel 51 is instantaneously brightened or darkened is prevented from occurring.

(3-3) Effect of Third Embodiment

In the present embodiment, the PWM pulse signal P3 having a frequency that is an (odd number/2) times the vertical synchronizing signal VS can be outputted to the inverter circuit 30 by selecting the output signal of the OR gate 23 in a case where the set duty ratio is not less than 50%, while selecting the output signal of the AND gate 22 in a case where the set duty ratio is less than 50%. Consequently, a flicker is prevented from being generated on the screen of the liquid crystal display panel 51.

In this case, the new provision of the addition circuit 20 allows the PWM pulse signal P3 having a frequency that is an (odd number/2) times the vertical synchronization frequency to be generated using a control device 10 capable of generating the PWM pulse signal P1 having a frequency that is only an integer times the vertical synchronization frequency. As a result, it is possible to reduce the size and the cost of the backlight control device as well as to reduce the thickness, the weight, and the cost of the display apparatus.

The use of the mono-multi vibrator 26 prevents the improper period from being generated in the PWM pulse signal P3 when the set duty ratio is changed. Thus, the phenomenon in which discontinuity occurs in the change in the luminance of the backlight 52 and the screen of the liquid crystal display panel 51 is instantaneously brightened or darkened is prevented from occurring.

The pulse width of the expanded pulse signal P5 generated by the mono-multi vibrator 26 is determined in consideration of the degree at which the period of the PWM pulse signal P3 is disturbed at the time of switching the set duty ratio and the degree at which the luminance is disturbed, which is visually allowed in the backlight 52.

(4) Correspondence Between each Constituent Element in Claim and Each Element in Embodiment Although description is made of an example in which a correspondence between each of constituent elements in the claims and each of elements in the embodiments, the present invention is not limited to the following example.

In the embodiments described above, the inverter circuit 30 corresponds to an inverter, the MPU 40 or the remote control 60 corresponds to a designator, the PWM generation circuit 12 corresponds to a pulse generator, the frequency division circuit 21 corresponds to a frequency divider, the selector 24 or the selector 24 or 25 corresponds to a selector, the mono-multi vibrator 26 corresponds to a pulse expander, and the liquid crystal display panel 51 corresponds to a display panel. The PWM pulse signal P3 or the PWM pulse signal P4 corresponds to a dimming pulse signal, the PWM pulse signal P2 corresponds to a first pulse signal, the OR gate 23 corresponds to a first logic element, the AND gate 22 corresponds to a second logic element, the logical sum corresponds to a first logical operation, and the logical product corresponds to a second logical operation.

(5) Other Embodiments

Although in the above-mentioned first to third embodiments, the OR gate 23 is used as the first logic element, and the AND gate 22 is used as the second logic element, the present invention is not limited to the same. For example, a NOR gate may be used as the first logic element, and a NAND gate may be used as the second logic element.

Although in the above-mentioned third embodiment, the mono-multi vibrator 26 is used as a pulse expander, the present invention is not limited to the same. For example, another waveform shaping circuit may be used.

Furthermore, the mono-multi vibrator 26 in the backlight control device in the above-mentioned third embodiment may be provided in the backlight control device in the second embodiment.

INDUSTRIAL APPLICABILITY

The backlight control device according to the present invention is useful for controlling backlight dimming and particularly, burst dimming in a display apparatus such as a liquid crystal television or a liquid crystal display apparatus.

The invention claimed is:

1. A backlight control device that controls the luminance of a backlight, comprising:
   an inverter that drives said backlight in response to a dimming pulse signal for controlling a luminance;
   a designator that designates the duty ratio of said dimming pulse signal;
   a pulse generator that generates a first pulse signal having a frequency that is an odd number times a vertical synchronization frequency and being pulse-width modulated on the basis of the duty ratio designated by the designator and a vertical synchronizing signal;

a frequency divider that frequency-divides the first pulse signal generated by said pulse generator, to output a second pulse signal having a frequency that is one-half that of said first pulse signal;

a first logic element that performs a first logical operation on the first pulse signal generated by said pulse generator and the second pulse signal outputted by said frequency divider;

a second logic element that performs a second logical operation on the first pulse signal generated by said pulse generator and the second pulse signal outputted by said frequency divider; and a selector that selects an output signal of said first logic element as a third pulse signal in a case where the duty ratio designated by said designator is not less than a predetermined value, while selecting an output signal of said second logic element as a third pulse signal in a case where the duty ratio designated by said designator is less than said predetermined value, to output a third pulse signal having a frequency that is an (odd number/2) times the vertical synchronization frequency as said dimming pulse signal.

2. The backlight control device according to claim 1, wherein said predetermined value is 50%.

3. The backlight control device according to claim 2, wherein said pulse generator sets the duty ratio of the first pulse signal to 2 (D-50) % in a case where the duty ratio D designated by said designator is not less than 50%, while setting the duty ratio of the first pulse signal to 2D % in a case where the duty ratio D designated by said designator is less than 50%.

4. The backlight control device according to claim 1, wherein said selector outputs a pulse signal having a predetermined duty ratio for a predetermined time period as said dimming pulse signal in a case where the duty ratio designated by said designator is switched between a value that is not less than said predetermined value and a value that is less than said predetermined value.

5. The backlight control device according to claim 4, wherein said selector outputs the second pulse signal outputted from said frequency divider for a predetermined time period as said dimming pulse signal in a case where the duty ratio designated by said designator is switched between a value that is not less than said predetermined value and a value that is less than said predetermined value.

6. The backlight control device according to claim 1, further comprising a pulse expander that expands a pulse of the first pulse signal generated by said pulse generator to a predetermined width and outputs a fourth pulse signal having the expanded pulse, said frequency divider frequency-dividing the fourth pulse signal outputted from said pulse expander.

7. The backlight control device according to claim 6, wherein said pulse expander comprises a mono-multi vibrator.

8. The backlight control device according to claim 1, wherein said first logical operation is the logical sum, and said second logical operation is the logical product.

9. The backlight control device according to claim 7, wherein said first logic element comprises an OR gate, and said second logic element comprises an AND gate.

10. A display apparatus comprising:

a signal processing circuit that converts an inputted video signal into a predetermined format and separates a vertical synchronizing signal;

a display panel that displays the video signal obtained by said signal processing circuit as an image;

a backlight provided on a back surface of said display panel; and a backlight control device that controls the luminance of said backlight, said backlight control device comprising an inverter that drives said backlight in response to a dimming pulse signal for controlling a luminance, a designator that designates the duty ratio of said dimming pulse signal, a pulse generator that generates a first pulse signal having a frequency that is an odd number times a vertical synchronization frequency and being pulse-width modulated on the basis of the duty ratio designated by said designator and a vertical synchronizing signal separated by said signal processing circuit, a frequency divider that frequency-divides the first pulse signal generated by said pulse generator, to output a second pulse signal having a frequency that is one-half that of said first pulse signal, a first logic element that performs a first logical operation on the first pulse signal generated by said pulse generator and the second pulse signal outputted by said frequency divider, a second logic element that performs a second logical operation on the first pulse signal generated by said pulse generator and the second pulse signal outputted by said frequency divider, and a selector that selects an output signal of said first logic element as a third pulse signal in a case where the duty ratio designated by said designator is not less than a predetermined value, while selecting an output signal of said second logic element as a third pulse signal in a case where the duty ratio designated by said designator is less than said predetermined value, to output a third pulse signal having a frequency that is an (odd number/2) times the vertical synchronization frequency as said dimming pulse signal.

11. The display apparatus according to claim 10, wherein said signal processing circuit and said pulse generator are composed of a large-scale integrated circuit.

12. The display apparatus according to claim 10, wherein said display panel comprises a liquid crystal display panel.

* * * * *